Oct. 16, 1951 — J. T. ROONEY — 2,571,488
THICKNESS MEASURING DEVICE
Filed June 15, 1949
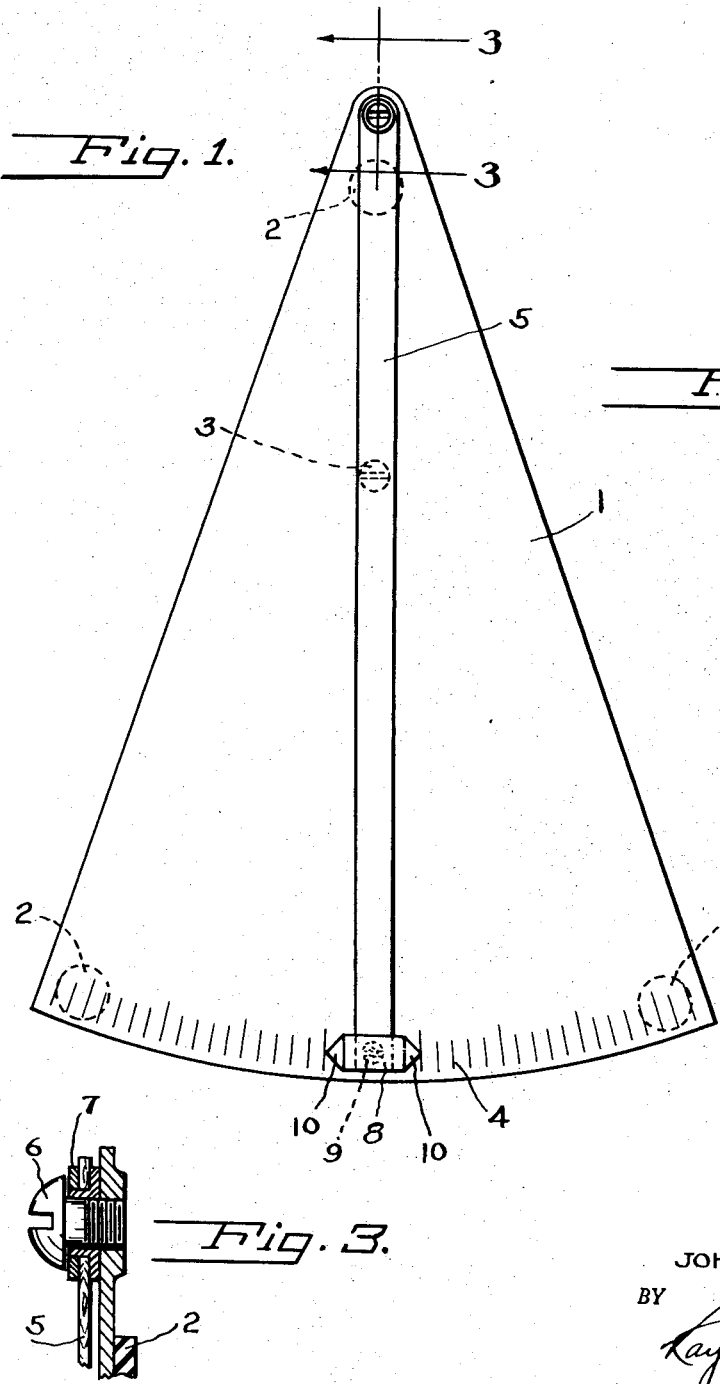
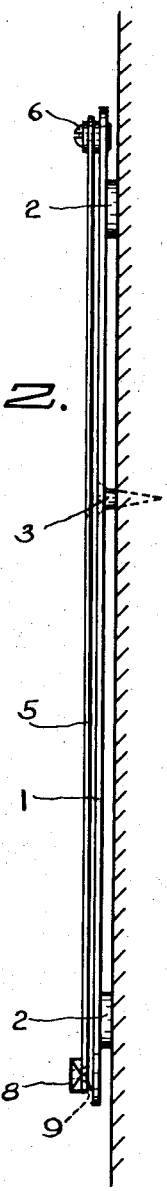
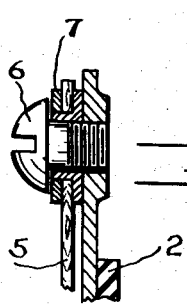
INVENTOR.
JOHN T. ROONEY
BY Raymond A. Paquin
ATTORNEY.

Patented Oct. 16, 1951

2,571,488

UNITED STATES PATENT OFFICE 2,571,488

THICKNESS MEASURING DEVICE

John T. Rooney, West Palm Beach, Fla.

Application June 15, 1949, Serial No. 99,163

8 Claims. (Cl. 175—183)

This invention relates to measuring devices and has particular reference to a new and improved device for measuring the thickness of magnetic platings such as nickel plating on non-magnetic bases.

An object of the invention is to provide a measuring device for measuring the thickness of platings or the like which is relatively simple and economical in construction and efficient yet relatively simple in operation.

Another object of the invention is to provide a new and improved device for measuring the thickness of coatings without damaging or injuring the same.

Another object of the invention is to provide a new and improved device for measuring the thickness of magnetic platings such as nickel plating on non-magnetic bases such as brass, copper, zinc alloy, aluminum or other non-magnetic bases.

Other objects and advantages of the invention will be apparent from the following description taken in connection with the accompanying drawing. It will be understood that changes may be made in the details of construction and arrangement of parts as the preferred form has been shown by way of illustration only.

In the drawings:

Fig. 1 is a front view of a device embodying the invention;

Fig. 2 is a side view thereof; and

Fig. 3 is a fragmentary sectional view, on an enlarged scale, taken on line 3—3 of Fig. 1 and looking in the direction of the arrows.

Referring more particularly to the drawing wherein similar reference characters designate corresponding parts throughout the several views, the device shown embodying the invention comprises a base plate 1 of non-magnetic material such as wood, plastic, Masonite, or a non-magnetic metal such as brass, aluminum or the like which is provided with the rubber feet or pads 2 of suitable number and which is adapted to be secured to the wall by the screw 3 or other suitable means.

In addition to securing the base plate 1 to the wall, the screw 3 may perform an additional function, that is, the whole base plate 1 may be revolved about this screw 3 which thus serves as a means of setting the pendulum 5 at the zero point of the scale 4. In this manner the base plate 1 can be mounted on the wall very simply by means of the one screw 3 and the zero adjustment of the pendulum and scale is also taken care of by the same simple and inexpensive means.

The plate 1 is provided with the graduations 4 arranged in the form of a curved scale along the lower edge of said base 1 and which may be graduated in thousands and fractions thereof such as tenths of thousands and is adapted to indicate the thickness of the plating as hereinafter described.

The actual graduations 4 may be arbitrary from which a curve may be plotted, or a series of curves corresponding to various types of plating since there is a variation in the magnetic pull depending upon the various types. For example, bright nickel has about twice the magnetic pull of ordinary nickel. If desired, an undivided scale may be provided beside the arbitrary graduated one so that the undivided scale could be graduated directly in thousands and ten thousands of thickness for the particular type of material being plated.

The pendulum or pivotal member 5 is pivotally mounted on the base or plate 1 by means of the screw or bolt 6 and the pendulum 5 is adapted to be moved about said bolt 6 as a center. The grommet 7 provides a bearing for the bolt 6 in the member 5.

The pivotal bolt 6 from which the pendulum 5 is suspended should preferably be small in diameter to avoid friction and could comprise simply a pin. An alternate construction would be to use a piece of very thin gauge steel spring which avoids friction altogether, the retarding effect of the spring being negligible with the great leverage existing. This construction has been found to work very satisfactorily.

The pendulum member 5 may be formed of balsa wood, plastic or other non-magnetic material and has secured adjacent the lower end thereof the permanent magnet 8 which may be secured to the pendulum 5 by means of the screw 9 or other suitable means and the graduations 4 forming the curved scale beginning with a zero indication adjacent each of the opposite ends of this magnet 8 whereby the measurement may be made adjacent either of the opposite ends of said magnet 8. The magnet may have the opposite ends thereof 10 pointed as shown or these ends may be formed of other desired shape.

The indications for forming the scale as set forth above may be calibrated against samples of platings of known thickness.

When it is desired to measure the thickness of a coating or variations of the coating on various parts instantly or without damaging or injuring the parts, the plated part is placed against either of the ends of the magnet 8 and pulled until the magnet releases itself from the sample. The reading on the scale at the point where the magnet releases itself from the sample can then be read to directly indicate the thickness of the plating as the pulling of the magnet is proportional to the thickness of the coating and, therefore, allows the reading of the thickness of the plating directly from the scale. This provides a non-destructive for instantly obtaining the thickness of a magnetic coating or plating on a non-magnetic base.

The device could also be used to measure the thickness of magnetic or non-magnetic coatings on magnetic bases. For this purpose a weight could be hung on the pendulum 5 so that a magnetic base metal, ferrous for example, would pull the pendulum 5 to the full length of the scale 4, then any applied plating could be measured in thickness from a curve plotted from tests with known thickness of plating which would show lower scale readings according to the thickness of intervening plating. In such case the base being more magnetic than the coating, for example, nickel or steel, the main attraction comes from the base metal and is lessened by any thickness of intervening plating in proportion to the thickness of the intervening layer of plating, magnetic or non-magnetic.

From the foregoing it will be seen that I have provided simple, efficient and economical means for obtaining all of the objects and advantages of the invention.

Having described my invention, I claim:

1. In a device of the character described, a relatively flat support of non-magnetic material, a member of non-magnetic material mounted for pivotal movement across the surface of said support, a magnet carried by said pivotal member and adapted to be pivoted therewith and a scale on said support adjacent said magnet.

2. In a device of the character described, a relatively flat support, a pendulum mounted for pivotal movement across the surface of said support, a magnet carried by said pendulum and adapted to be pivoted therewith and a scale on said support, said pendulum being movable relative to said scale and adapted to indicate on said scale the extent of the movement of said magnet.

3. In a device of the character described, a relatively flat support of non-magnetic material, a member of non-magnetic material mounted for pivotal movement across the surface of said support, a magnet carried by said pivotal member and adapted to be pivoted therewith and a scale on said support adjacent said magnet, said scale being calibrated to indicate the thickness of a magnetic plating on a non-magnetic base.

4. In a device of the character described, a relatively flat support, a pendulum mounted on said support for pivotal movement across the surface of said support, a magnet carried by said pendulum and adapted to be pivoted therewith and a scale on said support adjacent said magnet and adapted to indicate the extent of the movement of said magnet, said scale being calibrated to indicate the thickness of a magnetic plating on a non-magnetic base.

5. A measuring device for indicating the thickness of a magnetic coating on a non-magnetic base comprising a relatively flat support having a scale, a pointer mounted on said support for pivotal movement across the surface of said support relative to said scale and a permanent magnet secured to said pointer and adapted to be moved therewith relative to said scale by the magnetic attraction of the magnetic coating, the thickness of which is to be measured.

6. A measuring device for indicating the thickness of a magnetic coating on a non-magnetic base comprising a relatively flat support having a scale, a pointer mounted on said support for pivotal movement across the surface of said support relative to said scale and a permanent magnet secured to said pointer and adapted to be moved therewith relative to said scale by the magnetic attraction of the magnetic coating, the thickness of which is to be measured, said scale being calibrated to directly indicate the thickness of the magnetic coating.

7. A measuring device for indicating the thickness of a magnetic coating on a non-magnetic base comprising a relatively flat support having a scale, a pointer mounted on said support for pivotal movement across the surface of said support relative to said scale and a permanent magnet secured to said pointer and adapted to be moved therewith relative to said scale by the magnetic attraction of the magnetic coating, the thickness of which is to be measured, said magnet being normally positioned with its end against the zero indication on said scale.

8. A measuring device for indicating the thickness of a magnetic coating on a non-magnetic base comprising a relatively flat support having a scale, a pointer mounted on said support for pivotal movement across the surface of said support relative to said scale and a permanent magnet secured to said pointer and adapted to be moved therewith relative to said scale by the magnetic attraction of the magnetic coating, the thickness of which is to be measured, said magnet having its opposite ends normally at the zero indication on said scale.

JOHN T. ROONEY.

REFERENCES CITED

The following references are of record in the file of this patent:

UNITED STATES PATENTS

| Number | Name | Date |
| --- | --- | --- |
| 1,311,722 | Stee et al. | July 29, 1919 |
| 1,751,710 | Ohland | Mar. 25, 1930 |
| 1,778,655 | Wyman | Oct. 14, 1930 |
| 2,543,570 | Eder | Feb. 27, 1951 |

FOREIGN PATENTS

| Number | Country | Date |
| --- | --- | --- |
| 575,150 | Great Britain | Feb. 5, 1946 |